Nov. 12, 1935.  A. S. FITZ GERALD  2,021,099
ELECTRIC CONTROL SYSTEM
Filed July 27, 1933   3 Sheets-Sheet 1
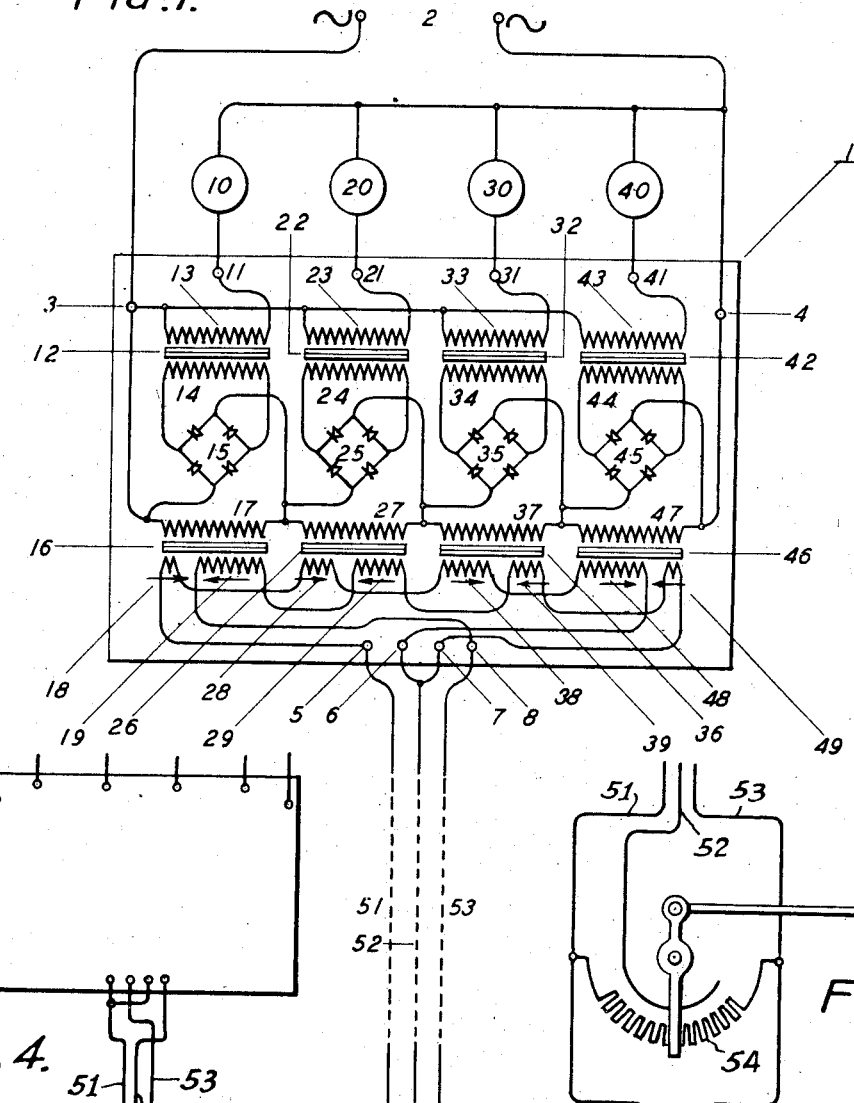
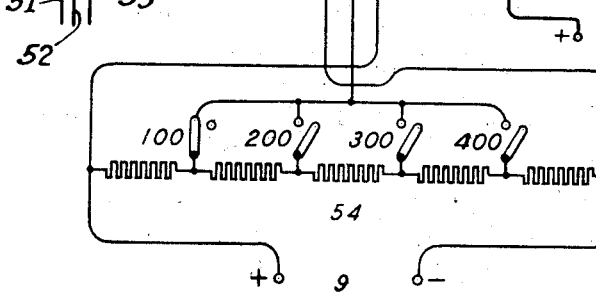
INVENTOR
Alan S. FitzGerald

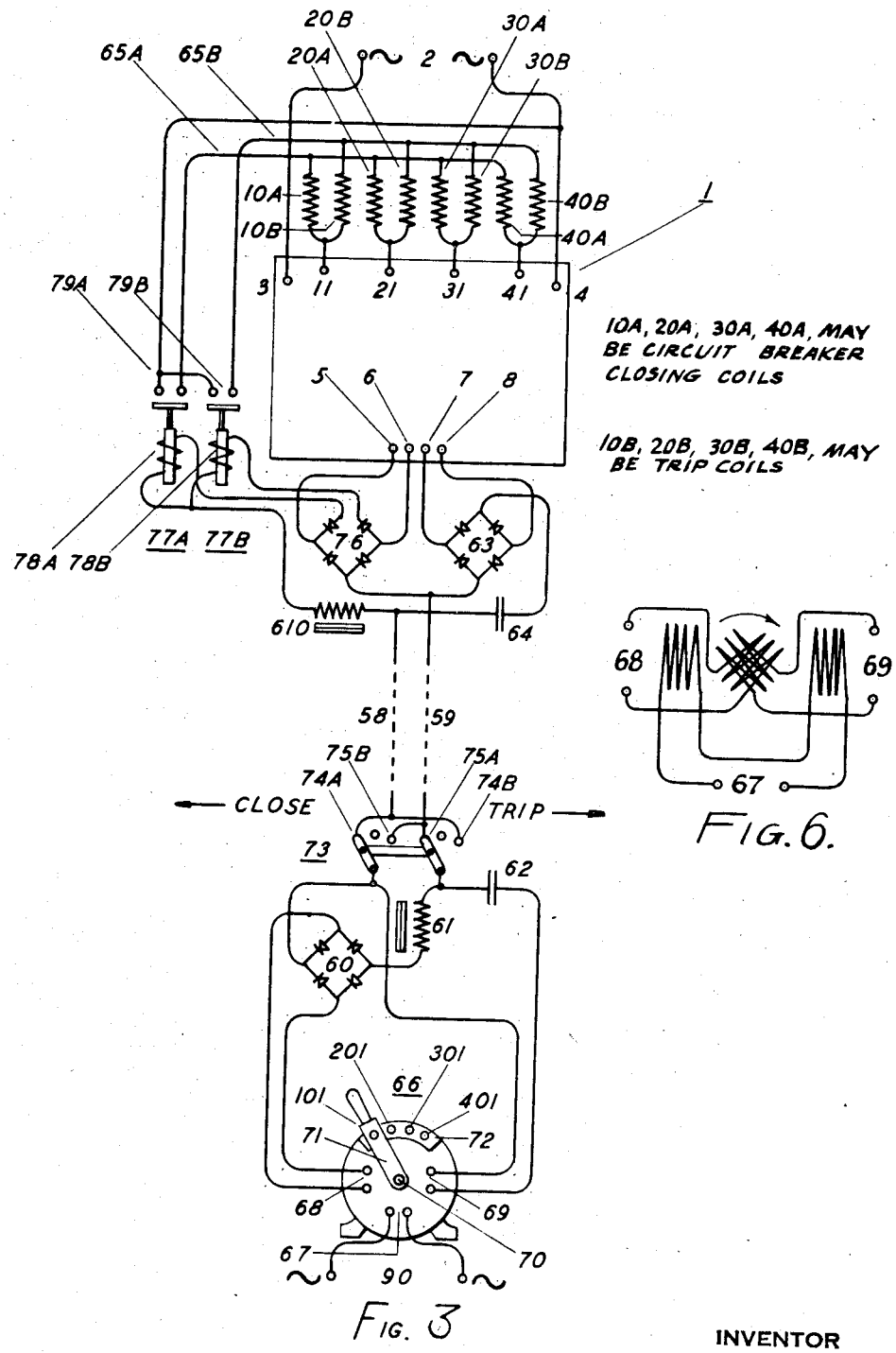

Patented Nov. 12, 1935

2,021,099

UNITED STATES PATENT OFFICE 2,021,099

ELECTRIC CONTROL SYSTEM

Alan S. Fitz Gerald, Wynnewood, Pa.

Application July 27, 1933, Serial No. 682,421
In Great Britain December 2, 1932

16 Claims. (Cl. 177—353)

This invention relates to electric control systems, and more particularly to remote signalling and supervisory systems.

The invention furnishes a novel selective or consecutive control action for actuating a number of individual electrical devices or circuits. Its action is analogous, in the electrical art, to the action of a multi-cylinder engine cam shaft, in mechanics. When such a cam shaft is uniformly rotated each valve is operated and retracted consecutively.

In my novel electrical system, a variation in the ratio of two electric currents is the electrical analogy of the rotation of the cam shaft. The individual electrical devices correspond to the valves. Thus, if the current ratio be uniformly varied from one extreme to the other, each of the controlled devices will, consecutively, and one at a time, be first energized and then deenergized.

The invention is applicable to many forms of electrical signalling and control purposes which may utilize selective systems of the type disclosed such as, for example, elevator floor signals, remote supervisory systems, telemetering, teleprinting, multiple unit railroad motor control systems, transformer tap changing switch control, and many such other purposes as will be apparent to those skilled in the art.

My invention is operated by causing a variation between the relative magnitudes of two or more electric currents. Both currents may be variable, inversely or in opposite sense; or one current may be varied and the second current be maintained substantially constant.

My invention may be controlled from a distance by transmitting two relatively variable direct currents, two alternating currents, or one direct current and one alternating current. The control principle, in the latter instance, resides in the ratio between the magnitude of the direct current and that of the alternating current. An advantage of this latter arrangement is that both effects can be transmitted simultaneously over a single circuit.

In order to control a number of electrical devices or circuits, in accordance with such current ratios, I employ a novel arrangement of saturating reactors.

It is, therefore, an object of my invention to provide a means of controlling a plurality of load devices, consecutively or selectively, in accordance with variation in the ratio of two or more electrical effects; or, if one effect be maintained constant, in accordance with the variation in the magnitude of a single electrical quantity.

It is a further object of my invention to provide a control system, of the type specified, in which both of the electrical effects, constituting the controlling ratio, may be transmitted over a single circuit.

It is yet a further object of my invention to provide a system of the type specified which may be operated, at transmitting and receiving stations, from independent sources having no synchronous or any other relation, and which is substantially unaffected by reasonable variations in either voltage or frequency of such sources.

It is a further object of my invention to provide a simple and reliable system, furnishing a precise and accurate selective effect, which is independent of any moving elements or time relations. My invention requires neither rotating synchronous apparatus nor code impulse selective devices.

These and other novel features which I believe to be characteristic of my invention will be set forth with particularity in the appended claims. My invention itself, however, both as to its organization and method of operation, together with further objects and advantages thereof, may best be understood with reference to the following description taken in connection with the accompanying drawings, in which Figure 1 is a diagrammatic view of an embodiment of my invention for controlling four circuits over a three-wire channel by means of inversely variable direct currents;

Fig. 3 is a diagrammatic view of a further modification of my invention, by means of which double the number of circuits may be controlled by reversing the polarity of the direct current.

Figure 4 is a diagrammatic view showing a modified method of connecting the embodiment of my invention shown in Fig. 1;

Figure 5 is a diagrammatic view showing an arrangement for uniformly varying two ratio currents for controlling the apparatus of my invention, and;

Figure 6 is a diagrammatic view of an internal detail of a portion of the apparatus shown in Figure 3.

Figure 2:
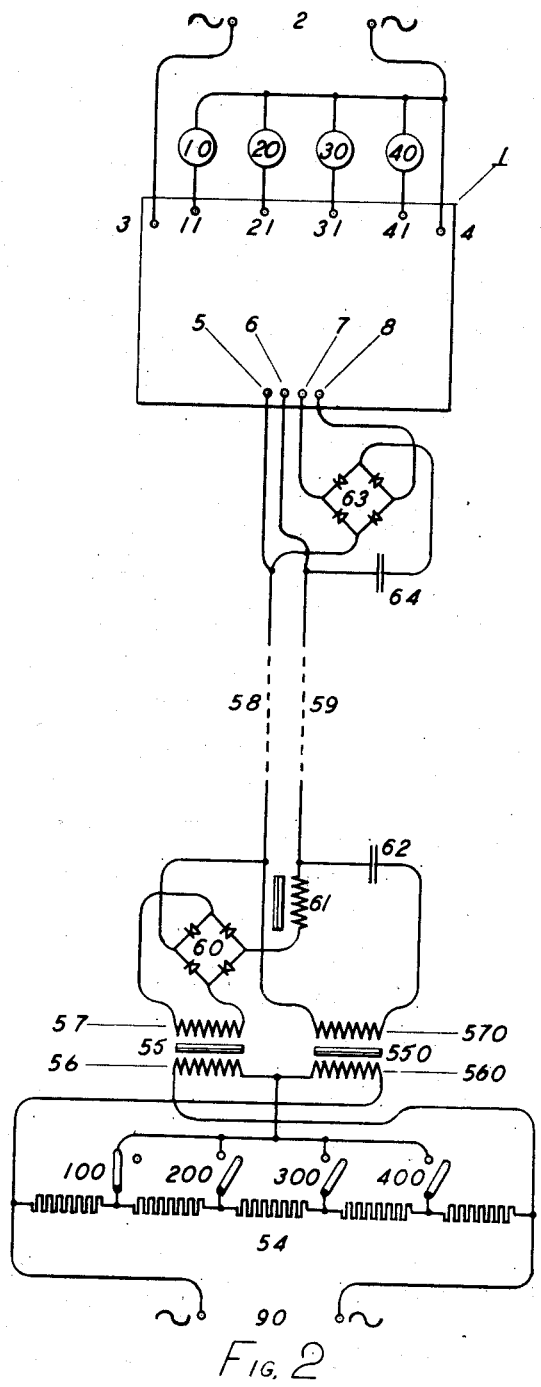
Fig. 2 is a diagrammatic view of a modification of the embodiment of my invention shown in Fig. 1, by means of which the same control effect can be carried out by transmitting relatively variable direct and alternating currents over a two-wire channel.

In Fig. 1, I show a selector circuit I, arranged in accordance with my invention, energized from an alternating current source 2, and adapted to control four loads, 10, 20, 30, 40.

In order to describe and explain the principle of my invention, the load circuits 10, 20, 30, 40 may be considered to be signal lamps, as indicated in Fig. 1. However, I wish it to be clearly understood that these may consist of the operating circuits of contactors, circuit breakers, etc., or may be electric motors or other power consuming devices.

While I have shown only four controlled load circuits, in order to describe and explain the operation of my invention in a simple manner, and to avoid complexity in the drawings, I wish it also to be clearly understood that my invention is capable of controlling much greater numbers than four. The maximum number of control circuits, which may be controlled, depends upon various factors, such as whether the system is to be operated continuously or intermittently, and upon the design of the apparatus used. At least twenty such load circuits can readily be controlled in the manner described, and the maximum number possible is substantially greater than twenty.

My receiving selector circuit 1 has terminals 3 and 4 for connection to the source 2 and, in addition, terminals 11, 21, 31 and 41, to which one terminal each of the load circuits 10, 20, 30, 40 is connected, the remaining terminals being commonly connected to one terminal of the source 2.

The circuit 1 includes a plurality of saturable reactors 12, 22, 32, 42, having reactance windings 13, 23, 33, 43 and saturating windings 14, 24, 34, 44. The reactance windings of these reactors are connected in series with the load circuits 10, 20, 30, 40, as shown in the drawings. The saturating windings 14, 24, 34, 44 are energized with direct current from rectifiers 15, 25, 35, 45. The circuit 1 also includes further saturable reactors 16, 26, 36, 46, having reactance windings 17, 27, 37, 47 and having each two saturating windings 18, 19, 28, 29, 38, 49 and 48, 49. The four reactance windings 17, 27, 37, 47 are connected in series to terminals 3 and 4. These reactance windings are thus energized with alternating current from the source 2. In parallel with each of the reactance windings 17, 27, 37, 47 of the reactors 16, 26, 36, 46, I connect the alternating or input sides of the rectifiers 15, 25, 35, 45. Each of these rectifiers is accordingly energized with alternating current in accordance with the alternating voltage drop across the reactance winding of one of the aforesaid saturating reactors.

The saturating windings of the reactors 16, 26, 36, 46 are divided into two groups, each forming a complete series circuit. Thus, 18, 28, 38 and 48 are connected in series to terminals 5 and 6. Saturating windings 19, 29, 39, 49 are connected to terminals 7 and 8.

The saturating windings 18, 28, 38, 48 and 19, 29, 39, 49, respectively, are connected in opposition. Thus, referring, for example, to the saturating reactor 16, the net saturating effect will be the difference between the direct current excitation set up in the winding 18 and that set up in the winding 19. The same relation holds good for the reactors 26, 36, 46.

The ratio between the numbers of turns of the two opposing saturating windings on each of the saturating reactors 16, 26, 36, 46 is dissimilar for each of these four reactors. This difference is an important feature of my invention.

The circuit comprising the saturating windings 18, 28, 38, 48 is energized by applying direct current excitation to terminals 5 and 6. Likewise, the circuit which includes 19, 29, 39, 49 is energized by applying direct current excitation, preferably derived from the same source, to terminals 7 and 8. The circuit 1 is selectively controlled by varying the relative magnitudes of the direct current excitation applied respectively to 5, 6 and 7, 8.

The ratio between these two direct currents may be varied in a number of different ways, according to the purpose to which my invention is applied. For example, if it be utilized as a selective control system to be actuated at the transmitting station by manual or mechanical control, I prefer to cause these two direct currents to vary in opposite sense or inversely. If, on the other hand, my invention be used for the purpose of furnishing a controlling effect in accordance with a variation in the magnitude of a single variant such as, for example, an electric current or voltage, then I prefer to vary one of the direct currents and to maintain the other current substantially constant. By the term "substantially constant", I mean that the second current is intended to vary only in accordance with the voltage of the source from which it is derived.

Let it be supposed, by way of example, that the circuit 1 be controlled by varying inversely the direct currents applied respectively to 5, 6 and 7, 8. If this method of variation be employed, the sum of the number of turns of the two saturating windings on each of the reactors 16, 26, 36, 46 may be the same in each case. That is to say, the turns of 18 plus 19; 28 plus 29; 38 plus 39, or 48 plus 49, may all be equal; but, the ratio of these turns will be dissimilar.

Let it be assumed, for example, that the total turns included in the two windings for each reactor be 1000 turns. According to this assumption, for 4-circuit control, the winding 18 will have 200 turns and the winding 19, 800 turns; 28 will have 400 and 29 will have 600; 38 will have 600 and 39 will have 400; 48 will have 800 and 49 will have 200. The ratios of these turns are governed by the following simple relation. If there are "$n$" load circuits to be controlled, the ratio of the turns on the first reactor corresponding to 16, in Fig. 1, will be $$\frac{1}{n+1}$$

for the first winding, and $$\frac{n}{n+1}$$

for the second winding, of the total turns. Similarly, the second reactor will be divided in the ratio of $$\frac{2}{n+1} \text{ and } \frac{n-1}{n+1}$$

Other intervening ratios will be in accordance with the above principle. The last or $n$th reactor will be divided in the ratio of $$\frac{n}{n+1} \text{ and } \frac{1}{n+1}$$

The purpose of this arrangement of turn ratios will be readily understood if the following explanation is considered.

It has been pointed out that the two saturating circuits connected, respectively, to 5, 6 and 7, 8 are connected in opposition. It is, therefore, apparent that, for any given reactor, there is one current ratio—and but one only—which, in conjunction with the respective number of turns on the two opposing windings, will set up equal and opposite excitation in these two windings, resulting in zero saturating ampere turns. This condition will arise when the current ratio is the reciprocal of the turn ratio. For all other current ratios, one or the other winding will preponderate, and there will be resultant saturating ampere turns.

It having been postulated that the turn ratio is different in the case of each reactor 16, 26, 36 and 46, it follows that if the current ratio be set so that the above condition is set up in the case of one of the reactors, the same current ratio cannot set up this condition for any other reactor. The current ratio can only be adjusted so as to cause one reactor at a time to be unsaturated. All the remaining reactors will be subjected to saturating ampere turns.

Due to the turn ratio being made different for each of the reactors 16, 26, 36, 46, each reactor, in order to give rise to equal and opposite excitation, will require a different current ratio. Thus, a specific current ratio, which will cause zero saturation, is associated with each reactor.

My circuit 1 is so arranged that an unsaturated condition of any one of the reactors 16, 26, 36 or 46 causes illumination of the corresponding signal lamp 10, 20, 30 or 40.

This result is achieved by the method of connection shown in Fig. 1 and previously described. The reactance windings 17, 27, 37 and 47 of the reactors 16, 26, 36, 46 are all connected in series across the source 2. Thus, there will be a potential drop across each reactance winding commensurate with the effective value of the impedance thereof. If all of the reactances are unsaturated, or if all of them should be saturated to an equal extent, the drop across each of the windings 17, 27, 37, 47 would be equal. This condition, however, occurs only when the apparatus is not actuated by a control signal and the circuits connected to 5, 6 and 7, 8, are not energized with direct currents.

When the circuit 1 is controlled by the two ratio currents, due to the special turn ratios employed, in the manner above described, all of the reactors except one are saturated. Thus, the effective impedance of the reactance windings of the saturated reactors is low, but the impedance of the one winding situated on the reactor which receives, due to reciprocal coincidence between the turn ratio and the current ratio, zero saturating ampere turns, is much greater.

It, therefore, follows that the potential gradient along the series circuit, including the windings 17, 27, 37, 47, under this condition, is nonuniform. A substantial portion of the voltage of the source 2 appears across the unsaturated reactor. A negligible voltage drop exists across the remaining reactors.

The rectifiers 15, 25, 35, 45, being connected in parallel with each of the windings 17, 27, 37, 47, will be energized in accordance with the above voltage drops. Thus, when the current ratios are set so that one of the reactors 16, 26, 36, 46 is unsaturated, the corresponding rectifier 15, 25, 35 or 45 will be energized in accordance with the increased voltage drop across the reactance winding. The remaining rectifiers will be energized in a correspondingly less degree.

Each rectifier 15, 25, 35, 45 supplies saturating current to the saturating reactors 12, 22, 32, 42 which control the energization of the lamps 10, 20, 30, 40. Thus, due to the action of the rectifiers 15, 25, 35, 45 and the reactors 14, 24, 34, 44, the lamps are selectively controlled by the ratio of the currents applied to the terminals 5, 6 and 7, 8. When the ratio is adjusted so that one of the reactors 16, 26, 36 or 46 is unsaturated, the corresponding lamp is illuminated at full brilliance. All of the other lamps are energized to an insufficient extent to cause any visible effect.

The control effect can be exerted in several different ways. For example, if the ratio of the two currents be uniformly varied from one extreme to the other, first, the lamp 10 will come up to full brilliance; 10 will then go out and 20 will be illuminated; 20 will likewise black out as 30 comes up, which latter, in turn, will go out as 40 reaches full intensity of illumination. While only four lamps are shown in the drawings for the reasons stated, this same effect can be produced by means of my invention with 20 or more lamps.

The above consecutive control action, it will readily be perceived, corresponds exactly to the cam-shaft analogy cited in the preamble.

This consecutive type of control is most useful in connection with automatic regulating and control systems. For example, by means of my invention, the taps on a transformer may consecutively be changed in accordance with the increase of a load current.

On the other hand, for many other control purposes specific selective control is preferable. For this purpose, instead of causing the ratio to vary through the operating range, means may be provided for setting the current ratios, in the case of Fig. 1, to any one of four specific ratios corresponding to the values which energize the lamps 10, 20, 30, 40 to full intensity.

I show in Fig. 1 a simple and effective arrangement for this purpose, the terminals 5, 6 and 7, 8 of the selector circuit 1 being energized through conductors 51, 52 and 53. It will be noted that conductors 51 and 52 energize the saturating circuit which is connected to terminals 5 and 6. Likewise, the circuit connected to terminals 7 and 8 is energized through 52 and 53, 52 being common to both circuits.

At the transmitting station I provide an arrangement energized from a direct current source 9 for supplying to the three conductors 51, 52, 53 relatively variable direct current voltages. Thus, 51 is connected to the positive terminal of the source 9, 53 is connected to the negative terminal, and 52 is arranged, by means of switches 100, 200, 300, 400 to be connected to any one of a number of taps provided upon a resistor 54 connected across the source 9.

In Fig. 1 a portion of the conductors 51, 52, 53 is shown in broken lines to signify that the transmitting station may be at a distance from the selector station 1.

Where four load circuits are to be controlled, the resistor 54 is provided with five sections of equal resistance so as to provide four uniformly spaced taps, as shown, to which the switches 100, 200, 300, 400 are connected.

It will be apparent that with this arrangement, various voltages can be applied to the conductors 51, 52, 53 at will. For example, if it be supposed that the source 9 is 100 volts, D. C., and that switch 100 be closed, it is apparent that there will be 80 volts between 51 and 52, and 20 volts between 52 and 53. If the switch 200 be closed and 100 be open, there will be 60 volts between 51 and 52 and 40 bolts between 52 and 53. With switch 300 closed, and the other switches open, the voltage between 51 and 52 will be 40, and between 52 and 53, will be 60. Likewise, with switches 100, 200, 300 open and 400 closed, the voltage between conductors 51 and 52 will be 20 and between 52 and 53 will be 80. The voltage between conductors 51 and 53, however, remains unchanged.

The positions of the taps on the resistance 54 may be adjusted in relation to the resistances of the lines 51, 52, 53 and the saturating windings 18, 28, 38, 48 and 19, 29, 39, 49 so that precisely the desired current ratios are provided. When switch 100 is closed, the current flowing at terminals 5, 6 should be four times that flowing at 7, 8. With the switches 200, 300 and 400, respectively, closed the corresponding ratios should be 1.5, 0.67 and 0.25.

The closing of switch 100 will then produce currents in 18 and 19 in reciprocal relation to the ratio between the turns of 18 and 19, and accordingly the reactor 16 will be unsaturated under this condition, 26, 36 and 46 being saturated. Thus, the lamp 10 will be illuminated by closing switch 100. In like manner, the closing of switches 200, 300 or 400 wil selectively light up 20, 30 or 40.

While I have shown in Fig. 1 one specific method of connection, by way of example, many obvious modifications and elaborations, falling within the scope of my invention, may be employed. For example, if it be desired to control my receiving circuit 1 by means of one variable current and one constant current, terminals 5 and 6 may be connected through conductors 51 and 53 across the source 9, so as to receive a constant current; and terminals 7 and 8 may be connected so as to receive a variable current by connecting 7 through the common conductor 51 to the source 9 and connecting terminal 8 to the tap switches. This method of connection is illustrated in Figure 4. With this arrangement, the turns on the windings 18, 28, 38, 48, which carry the constant current, may be different for each reactor 16, 26, 36, 46 and the turns on the windings 19, 29, 39, 49, which carry the variable current, may be of the same number for each of the four reactors referred to.

In the event that it is desired to control the load circuits, 10, 20, 30, 40, consecutively in accordance with some uniformly varying effect such as for instance, the mechanical displacement of a portion of some machine, a variable electrical quantity, or the like, the variable resistor 54 may be provided with a sliding contact instead of tap switches 100, 200, 300, 400, means being provided for actuating the sliding contact in accordance with the variable effect. Such an arrangement is illustrated in Figure 5.

While I have shown in Fig. 1 only a single rectifier energized by the voltage across the reactance windings 17, 27, 37, 47, and a single reactor controlling the load circuits 10, 20, 30, 40, in order to describe and explain, without unnecessary complication, the principles on which my present invention operates, I wish it to be clearly understood that, without departing from the spirit of my invention, I may utilize two or more such rectifier-reactor combinations, forming a multi-stage magnetic amplifying arrangement, in lieu of the single stage shown. By so doing, I may control loads 10, 20, 30, 40, of increased magnitude, or may control these loads with smaller values of the controlling or ratio currents, so that the amount of power which must be conveyed over the channel connecting the transmitting and receiving stations, may be held within limits not exceeding, for example, the energy level of communication circuits.

I have described such multi-stage magnetic amplifying circuits in my co-pending application for "Magnetic amplifiers," filed in the United States Patent Office on June 21, 1933 and bearing Serial No. 676,785; and it is to be understood that the arrangements disclosed in the cited application may be used with advantage in carrying into effect my present invention.

In Fig. 2, I show a modification of my invention adapted to control similar terminal or receiving equipment over a connecting channel consisting of two wires instead of three.

In Fig. 2, I show a selector circuit 1 which may be identical with that shown in Fig. 1. I have, therefore, in Fig. 2, omitted the internal connections of the circuit 1 showing only terminals 3, 4, 5, 6, 7, 8 and 11, 21, 31, 41, all as described in reference to Fig. 1.

The selector circuit 1 is energized from the source 2 and is adapted to control load circuits 10, 20, 30, 40 in the manner hereinbefore described.

At the transmitting station I provide switches 100, 200, 300, 400 and a tap resistor 54 exactly as shown in Fig. 1. However, in Fig. 2, the resistor 54 is energized across an alternating source 90, instead of a direct current source, as was shown in Fig. 1.

Instead of connecting the tap switches directly to the connecting conductors, in Fig. 2 I show a pair of transformers 55 and 550 having primary windings 56 and 560 and secondary windings 57 and 570. The tapped resistor 54 and tap switches 100, 200, 300, 400 are connected to the primary windings 56 and 560, so that the two transformers 55 and 550 are each individually energized in accordance with the voltage ratio determined by the position of the tap switches. Thus, one extremity of the resistor 54 is connected to primary winding 56, and the other extremity of the resistor is connected to primary winding 560. A common connection from the primary windings is made to the contacts of the tap switches 100, 200, 300, 400, as shown in the drawings. Thus, if the source 90 be supposed to be 100 volts A. C., and if the switch 100 be closed and the remaining switches left open, 80 volts will be impressed upon winding 56 and 20 volts across winding 560. Other corresponding ratios will be furnished if 200, 300 or 400 be closed instead of 100, substantially as described in reference to Fig. 1. Only two outgoing conductors 58 and 59 are provided from the transmitting station. These are energized jointly by transformers 55 and 550 in the following manner. A rectifier 60 is energized from the secondary winding 57 of transformer 55 and rectified current is furnished by this rectifier through a reactor 61 to the conductors 58 and 59. The secondary winding 570 of transformer 550 is likewise connected to the conductors 58 and 59 through a condenser 62. It will be apparent that the condenser 62 precludes the flow of rectified current from 60 in winding 570, and that the reactor 61 inhibits flow of any alternating current energy from 570 in the rectifier 60.

It is, therefore, apparent that, in accordance with this arrangement, there is impressed upon conductors 58 and 59 a direct current voltage and an alternating current voltage, the ratio of the former to the latter being adjustable in accordance with the operation of tap switches 100, 200, 300 or 400.

Referring now to the selector circuit 1, it will be observed that conductors 58 and 59 are directly connected to terminals 5 and 6 of the selector circuit 1. On referring to Fig. 1, it will be noted that between terminals 5 and 6, there are connected the saturating windings 18, 28, 38 and 48. These windings, being wound to receive direct current, present a high impedance to alternating current; and the alternating current voltage, applied to conductors 58 and 59, emanating from the transformer 550, does not cause any appreciable flow of alternating current in the circuit connected to terminals 5 and 6.

At the receiving station, a further rectifier 63 is energized in series with the condenser 64, across the conductors 58 and 59. Due to the condenser 64, it is apparent that no direct current from 58 and 59 can flow in 63, but that the alternating current energy transmitted by 58 and 59, being conducted by the condenser 64, energizes the rectifier 63. Rectified output from 63 is connected to terminals 7 and 8 of the selector circuit.

On referring to Fig. 1, it will be noted that saturating windings 19, 29, 39, 49 are connected to terminals 7 and 8. Accordingly, 19, 29, 39, 49 are energized in accordance with the output of 63.

Since 63 is energized exclusively by the alternating current component of the mixed D. C. and A. C. energy, transmitted by 58 and 59, saturating windings 19, 29, 39, 49 are energized proportionately in accordance with the alternating current component. It has already been pointed out that the saturating windings 18, 28, 38, 48 are energized in accordance with the direct current component transmitted by 58 and 59. On referring again to the transmitting station, it will be apparent that the direct current component of the energy delivered to the conductors 58 and 59 is derived through rectifier 60 from transformer 55. Likewise, the alternating current component is derived from transformer 550.

Saturating windings 18, 28, 38 and 48 are, therefore, energized, through the two conductors 58 and 59, with direct current proportionately to the alternating current applied to transformer 55; and saturating windings 19, 29, 39 and 49 are energized with direct current proportionately to the alternating current applied to transformer 550. Thus, the position of the taps on 54 may be located so that, when switch 100 is closed, 200, 300 and 400 being open, the direct current excitation applied respectively to 18, 28, 38, 48 and 19, 29, 39, 49 will be in the ratio of 4 to 1. Thus, the conditions applied to the receiving equipment 1, in Fig. 2, will be exactly the same as would result in Fig. 1 by the closing of switch 100. Thus, the lamp 10 is illuminated, and 20, 30 and 40 are not. In a similar manner, either 20, 30 or 40 may be lit by closing switches 200, 300 or 400. It will be apparent to those skilled in the art that a plurality of equipments, substantially as shown in Fig. 2, may be employed if it is desired to control a very large number of circuits. It will further be obvious to those skilled in the art that conductor 58 may constitute a common conductor for all such additional apparatus. Thus, for each additional set of apparatus, as shown in Fig. 2, one conductor only in addition is necessary.

In Fig. 3, I show a further modification of my invention adapted especially for the purpose of remote or supervisory control, such as is used on large inter-connected power systems.

In general, the principal function of such a supervisory system is to control circuit breakers. For each circuit breaker so controlled, it will be necessary to perform a closing operation and an opening operation.

The modification of my invention, which I show in Fig. 3, is adapted to furnish closing and tripping functions for any given number of circuit breakers so controlled without doubling the amount of apparatus comprised by my selector circuit 1.

In Fig. 3, I show a selector circuit 1 which may be identical with that shown in Figs. 1 and 2, adapted to control 4 circuit breakers. It is, of course, to be understood that a much greater number than four can be controlled by means of my invention.

In Fig. 3, I show the alternating current source 2, as in Figs. 1 and 2, connected to terminals 3 and 4 of the receiving circuit 1. In place of the load circuits or signal lamps 10, 20, 30, 40, shown in Figs. 1 and 2, I show in Fig. 3, connected to the terminals 11, 21, 31, 41 of the selector circuit 1, pairs of coils 10A, 10B, 20A, 20B, 30A, 30B, 40A, 40B. These coils are intended to represent the operating windings of the closing and tripping relays or contactors associated with the four circuit breakers. The circuit breakers, however, are not shown in the drawings. Thus, 10A, 20A, 30A, 40A represent the closing coils, and 10B, 20B, 30B, 40B the tripping coils.

As shown in the drawings, one extremity of the closing and tripping coil of each circuit breaker is connected together, respectively, to the terminals 11, 21, 31, 41 of my receiving circuit 1. The opposite extremities of all of the closing coils are connected to a common conductor 65A and, in like manner, the other extremities of the tripping coils are connected to a common conductor 65B.

Referring now to the apparatus at the transmitting station, while I may employ apparatus identical with that shown in Fig. 2, I show, in Fig. 3, an alternative method of controlling the outgoing signal which, in some instances, has certain advantages in practice.

In control systems, which are required to give extremely reliable service under adverse operating conditions, it is desirable to reduce to a minimum the number of contacts and like devices which, should they become dirty or corroded, may be a source of imperfect functioning.

Thus, in Fig. 3, I show the rectifier 60, reactor 61 and condenser 62, all as shown in Fig. 2, and performing identical functions.

In place of the tapped resistor 54, tap switches, and the transformers 55 and 550, I show, in Fig. 3, an alternative method of energizing the rectifier 60 and the conductors 58, 59, with two alternating voltages of which the relative magnitude may be controlled, comprising a variable output electrical device 66 which may consist of an electro-magnetic structure having relatively rotatable primary and secondary windings.

As shown in the drawings, the device 66 has a pair of terminals 67, energized from the source 90. The terminals 67 may internally be connected to a single-phase stator winding of the type employed in well-known forms of single-phase induction regulator. The device 66 has two further pairs of terminals 68 and 69. Terminals 68 and 69 may, internally, be connected, respectively, to two single-phase rotor windings similar to the movable windings provided in induction regulators, as illustrated in Figure 6.

The winding connected to 68 may be displaced, for example, 90 electrical degrees in relation to the winding which is connected to 69. Such a device, when energized with a fixed alternating current voltage applied through terminals 67 to the stator winding, will provide two secondary alternating current voltages appearing, respectively, at terminals 68 and 69, which voltages may be varied inversely by rotating the shaft 70, operatively related to the rotor of the device 66. For example, when the shaft 70 is turned so that the windings connected to 68 and 67 are coaxial, maximum voltage will appear at 68. Under this condition, the winding connected to 69 would be in quadrature with the winding connected to 67 and substantially no voltage will appear across terminals 69. In like manner, if the shaft 70 be now rotated through 90° so as to bring the windings connected to 67 and 69 into coaxial relation, maximum voltage will appear at 69 and zero voltage at 68. If the shaft 70 be turned half way between the two above cited positions, equal voltages will appear at terminals 68 and 69. In like manner, any desired ratio between these two voltages may be obtained by proportionately positioning the rotor by means of the shaft 70.

In view of the connection of the rectifier 60, the transformers 55 and 550 were provided in Fig. 2 in order to secure electrical discontinuity or isolation between the alternating voltages applied to the rectifier 60 and, through condenser 62, to the conductors 58 and 59. It will be noted in Fig. 3 that the windings connected to 68 and 69, while these are electrically related, should not be metallically connected together. Mounted upon the shaft 70 is a lever arm 71 moving over a segmental plate 72, provided with means for locating or locking the position of the rotor of the device 66 at four positions, 101, 201, 301 and 401, respectively. These positions are determined so that when the rotor of 66 is located, respectively, at positions 101, 201, 301 or 401, the ratio of the voltages appearing at terminals 68 and 69 corresponds exactly with the voltages applied, in Fig. 2, to windings 55 and 550 when switches 100, 200, 300 or 400 are closed.

In other words, device 66 has precisely the same function as the resistor 54, tap switches 100, 200, 300, 400 and transformers 55 and 550. However, device 66 has no contacts or exposed electrical connections.

The novel feature residing in the modification of my invention, which I show in Fig. 3, consists in the provision of a reversing switch 73 by means of which the connections to the conductors 58 and 59 may be reversed.

The switch 73 has contacts 74A and 74B connecting with conductor 58 and contacts 75A and 75B connected to conductor 59, as shown in the drawings.

It will be apparent that operation of the reversing switch 73 reverses the polarity of the direct current applied to the conductors 58 and 59. It has, of course, no significant effect in respect of the alternating current likewise applied to conductors 58 and 59 through the condenser 62.

The object of the reversing switch 73 is to secure selective closing or tripping action in respect of any specific circuit breaker which may be selected in accordance with the position at which the device 66 is set. For example, as indicated by the legend on the drawings, when the switch 73 is placed upon contacts designated by the suffix A, the polarity of conductors 58 and 59 is such as to furnish a closing action.

When the switch is placed on contacts designated by the suffix B, the reversed polarity is adapted to furnish a tripping action in respect to the circuit breaker so selected.

This effect is accomplished at the selector circuit 1 in the following manner:

Rectifier 63 and condenser 64 are connected in relation to the terminals 7 and 8 and the conductors 58 and 59, precisely as shown in Fig. 2, and fulfilling identical functions.

It will be apparent, in considering the operation of my invention, that the relative polarity of the excitation applied to the two groups of windings 10, 20, 30, 40 and 10, 20, 30, 40, respectively, since these windings must always set up opposing magnetizing effects, should remain unchanged. The action of the reversing switch 73 manifestly has no effect upon the rectified energy applied to terminals 7 and 8. The polarity of this excitation obviously remains fixed in accordance with the output connections of the rectifier 63. The polarity of the direct current energy delivered by conductors 58 and 59 is reversible in accordance with the position of the reversing switch 73. This reversing of polarity, however, must not be applied to terminals 5 and 6 for the reason explained above. Thus, in Fig. 3, I show an additional rectifier 76 having its output connected to terminals 5 and 6 and energized through reactor 610 by the conductors 58 and 59. The function of the reactor 610 is to preclude energization of 76 by the alternating voltage existing in conductors 58 and 59.

It will be noted that the rectifier 76 is not energized by alternating current as is customary in the case of rectifying devices; 76 is energized by the direct current component of the energy delivered by conductors 58 and 59. However, due to the action of the reversing switch 73, the polarity of the direct current component is reversed. The function of the rectifier 76 is to provide unchanged polarity of direct current excitation to terminals 5 and 6, irrespective of the position of the switch 73. In order to detect and utilize, for control purposes, at the receiving end, reversal of the polarity of the direct current signal, I include in two arms of the rectifier 76 relays 77A and 77B, having windings 78A and 78B and contacts 79A and 79B. On referring to the diagram, it will be apparent that when the switch 73 is in position "A", the action of the rectifier 76 is such that direct current flows in winding 78A and no current flows in winding 78B. Thus, relay 77A picks up and closes its contacts 79A. If the switch 73 be placed in the tripping position "B", the effect of the rectifier 76 is such that direct current flows in the coil 78B and the relay 77B picks up and closes its contacts 79B.

Selective action of relays 77A and 77B is thus furnished in accordance with the position of switch 73B without interfering with the selective action of the circuit 1.

As shown in the drawings, when relay 77A is picked up, conductor 65A, which is connected to all of the closing coils, is energized through contact 79A. When switch 73 is reversed and relay 77B is picked up, the conductor 65B, to which all of the trip coils are connected, is energized through contact 79B. Thus, it will be clear that if, for example, device 66 be set at position 101, the current appearing at terminals 5, 6 will be four times as great as that appearing at terminals 7, 8, which will cause either the closing coil 10A or the trip coil 18B to be energized. If the switch 73 is placed in position A, it is the closing coil that will be energized. If the switch 73 is placed in position B, the trip coil will be energized.

In the modification of my invention shown in Figs. 2 and 3, the alternating sources 2 and 98 may be synchronous or asynchronous, and may be of the same or different frequencies. The source 2 may be a commercial supply frequency as, for example, 60 cycles, as may also the source 98, if desired. However, it will be apparent to those skilled in the art that if the source 98 be of some higher frequency, such as 500 cycles or above, the cost of the reactors 61, 610 and the condensers 62 and 64 will be less.

Although, in Fig. 3, in order to describe and explain the principles of operation of my invention in a simple manner, the relays 77A and 77B have been diagrammatically depicted by a conventional symbol, I wish it to be understood that my invention is not to be restricted to any specific device for this purpose, and I may use any device conformable to the purpose for which my invention is to be utilized. For example, if it be considered an advantage to completely eliminate from the system all contacts and moving parts, I may employ, for performing the function of the devices 77A, 77B, further saturating reactors, or saturating reactors and rectifiers in combination, as described in my aforesaid copending application.

It will be apparent to those skilled in the art that although I have shown, by way of example, an embodiment of my invention for controlling remotely located apparatus, my invention may, with equal facility, be utilized for the purpose of transmitting signals indicating a position or condition of distant apparatus. Thus, it is immaterial whether the switches 100, 200, 300, 400, be considered to be manually operated switches in a load dispatcher's office for controlling remote work devices 10, 20, 30, 40, or whether the switches 100, 200, 300, 400, be automatically operated by remote work devices, and 10, 20, 30, 40, be signal devices situated in a dispatcher's office for indicating some remote condition, such as water level or the like.

Although I have chosen a particular embodiment of my invention for the purpose of explanation, many modifications thereof will be apparent to those skilled in the art to which it pertains. My invention, therefore, is not to be limited except insofar as is necessitated by the prior art and the spirit of the appended claims.

What I claim as new and desire to secure by Letters Patent of the United States is:

1. In a selective control system, an alternating current supply circuit, a plurality of saturable core devices having each an alternating current winding, means for connecting all of said alternating current windings in series to said supply circuit, a plurality of load circuits, means for energizing each of said load circuits in accordance with the voltage across one of said alternating current windings, and means for applying effective saturating excitation selectively to all of said saturable core devices except a pre-determined one selectively to control the energization of said load circuits in accordance with said selective saturating excitation.

2. In a selective control system, an alternating current supply circuit, a plurality of saturable core devices having each an alternating current winding, means for connecting all of said alternating current windings in series to said supply circuit, a plurality of load circuits, means for energizing each of said load circuits in accordance with the voltage across one of said alternating current windings, means for providing a plurality of variable direct currents, and means for subjecting, differently, each of said saturable core devices to a saturating effect derived jointly from said direct currents whereby a pre-determined relation between the magnitudes of said currents causes one of said saturable core devices to be substantially unsaturated so as to cause an increase in the energization of one of said load circuits due to said unsaturated condition.

3. In a selective control system, an alternating current supply circuit, a plurality of saturable core devices having each an alternating current winding, means for connecting all of said alternating current windings in series to said supply circuit, a plurality of load circuits, means for energizing each of said load circuits in accordance with the voltage across one of said alternating current windings, means for providing a plurality of variable direct currents, means for subjecting, differently, each of said saturable core devices to a saturating effect derived jointly from said currents, whereby when the ratio between said direct currents is varied, each of said load circuits, one at a time, may be subjected to substantially increased energization not more than one of said load circuits being so subjected at the same time.

4. In a selective control system, a plurality of saturable core devices, each of said devices having an alternating current winding a first direct current saturating winding and a second direct current saturating winding, said second saturating winding opposing the saturating effect of said first saturating winding, the ratio between the turns of said first and second windings being different in each of said saturable core devices, means for connecting all of said first saturating windings together to form a first direct current saturating circuit and means for connecting all of said second saturating windings together to form a second direct current saturating circuit, means for energizing said first saturating circuit and said second saturating circuit, respectively, with saturating currents having a predetermined relative magnitude so as to cause all of said saturable core devices except one to be saturated, an alternating current supply circuit, a plurality of load circuits, means for energizing said load circuits from said supply circuits, and means for controlling the energization of each of said load circuits inversely in accordance with the degree of saturation of one of said saturable core devices so as to cause the load circuit which is associated with the saturable core device which is unsaturated to be energized to a substantially greater extent than the remaining load circuits.

5. In a selective control system, an alternating current supply circuit, a plurality of saturable core devices, each of said devices having an alternating current winding a first direct current saturating winding and a second direct current saturating winding, said second saturating winding opposing the saturating effect of said first saturating winding, the ratio between the effective turns of said first and said second saturating windings being different in each of said saturable core devices, means for energizing all of said alternating current windings from said alternating current supply circuit, a plurality of load circuits, means for controlling the energization of each of said load circuits inversely in accordance with the impedance of one of said alternating current windings whereby the energization of each of said load circuits is caused to be decreased when one of said saturable core devices is subjected to effective saturating excitation and is increased when said saturable core device is unsaturated, together with means for providing a plurality of direct currents, means for energizing all of said first saturating windings in accordance with one of said direct currents and means for energizing all of said second saturating windings in accordance with another of said direct currents, together with means for varying a relation between said direct currents so as selectively to control the energization of said load circuits in accordance with said relation.

6. In a selective control system, an alternating current supply circuit, a plurality of saturable core devices, each of said devices having an alternating current winding a first direct current saturating winding and a second direct current saturating winding, said second saturating winding opposing the saturating effect of said first saturating winding, the ratio between the effective turns of said first and said second saturating windings being different in each of said saturable core devices, means for energizing all of said alternating current windings from said alternating current supp'y circuit, a plurality of load circuits, means for controlling the energization of each of said load circuits inversely in accordance with the impedance of one of said alternating current windings whereby the energization of each of said load circuits is caused to be decreased when one of said saturable core devices is subjected to effective saturating excitation and is increased when said saturable core device is unsaturated, together with means for providing a plurality of direct currents, means for energizing all of said first saturating windings in accordance with one of said direct currents and means for energizing all of said second saturating windings in accordance with another of said direct currents, together with means for varying a relation between said direct currents so as to cause said load circuits to be consecutively controlled.

7. In a selective control system, an alternating current supply circuit, a plurality of saturable core devices, each of said devices having an alternating current winding a first direct current saturating winding and a second direct current saturating winding, said second saturating winding opposing the saturating effect of said first saturating winding, the ratio between the effective turns of said first and said second saturating windings being different in each of said saturable core devices, means for energizing all of said alternating current windings from said alternating current supply circuit, a plurality of load circuits, means for controlling the energization of each of said load circuits inversely in accordance with the impedance of one of said alternating current windings whereby the energization of each of said load circuits is caused to be decreased when one of said saturable core devices is subjected to effective saturating excitation and is increased when said saturable core device is unsaturated, together with a circuit subject to electrical variations, means for deriving from said circuit a plurality of direct currents relatively variable in accordance with said variations, means for energizing all of said first saturating windings in accordance with one of said direct currents and means for energizing all of said second saturating windings in accordance with another of said direct currents selectively to control the energization of said load circuits in accordance wtih the electrical variations of said circuit.

8. In a selective control system, an alternating current supply circuit, a saturable core device having an alternating current winding a first direct current saturating winding and a second direct current saturating winding, means for energizing said alternating current winding from said supply circuit in-series with means for maintaining the current drawn from said source at an approximately constant value irrespective of the impedance of said alternating current winding, a load circuit, means for energizing said load circuit in accordance with the voltage across said alternating current winding, means for providing a plurality of direct currents, means for energizing said first direct current winding by one of said currents and means for energizing said second direct current winding by another of said currents, and means for simultaneously varying the magnitudes of said currents in opposite sense whereby the energization of said load circuit is increased when said direct currents are varied in a pre-determined manner.

9. In a selective control system, means for producing two variable alternating currents, a plurality of rectifying means for deriving two direct currents from said variable alternating currents, a plurality of saturable core devices, a two conductor circuit connecting said first mentioned means with said saturable core devices, a plurality of load circuits, means for controlling the energization of each of said load circuits in accordance with the degree of saturation of one of said saturable core devices, and means common to said saturable core devices for selectively applying effective saturation to a pre-determined number of said saturable core devices in accordance with the ratio between the magnitudes of said two direct currents, one of said rectifying means being located at one end of said circuit and another of said rectifying means being located at the other end, whereby the controlling currents for said system may be transmitted over said two conductor circuit.

10. In a selective control system, means for producing two direct currents, means for varying the relative magnitude of said direct currents, means for reversing the polarity of one of said direct currents, a plurality of saturable core devices, a plurality of load circuits, means connecting said load circuits to said saturable core devices for controlling the energization of each of said load circuits in accordance with the degree of saturation of one of said saturable core devices, and means common to said saturable core devices for selectively applying effective saturation to a pre-determined number of said saturable core devices in accordance with the ratio between the magnitudes of said two direct currents selectively to control the energization of said load circuits, unilaterally conducting means energized by said reversible direct current for exciting a circuit associated with said saturable core devices with direct current of unchanging polarity, and means responsive to said reversible polarity for controlling the connection of said load circuits to said saturable core devices in accordance therewith.

11. In combination, an alternating current supply circuit, a plurality of saturable core devices having each an alternating current winding, a first direct current saturating winding and a second direct current saturating winding, said second saturating winding opposing the saturating effect of said first saturating winding, means connecting all of said alternating current windings in series to said alternating current supply circuit, the ratio between the turns of said first and second saturating windings being different in each of said saturable core devices, means connecting all of said first saturating windings together to form a first direct current saturating circuit, means connecting all of said second saturating windings together to form a second direct current saturating circuit, a plurality of rectifiers, means connecting each of said rectifiers in parallel with one of said alternating current windings, a further plurality of saturable core devices having each an alternating current winding and a direct current saturating winding, means whereby each of said last mentioned saturating windings is energized with unidirectional current derived from one of said rectifiers, a plurality of load circuits, means connecting each of said load circuits to said alternating current supply circuit in series with one of said last mentioned alternating current windings, together with a source of direct current, means for energizing said first and second direct current saturating circuits therefrom, and means for varying the ratio between the magnitudes of the currents flowing in said first and said second direct current saturating circuits.

12. In combination, an alternating current supply circuit, a plurality of saturable core devices having each an alternating current winding, a first direct current saturating winding and a second direct current saturating winding, said second saturating winding opposing the saturating effect of said first saturating winding, means connecting all of said alternating current windings in series to said alternating current supply circuit, the ratio between the turns of said first and second saturating windings being different in each of said saturable core devices, means connecting all of said first saturating windings together to form a first direct current saturating circuit, means connecting all of said second saturating windings together to form a second direct current saturating circuit, a plurality of rectifiers, means connecting each of said rectifiers in parallel with one of said alternating current windings, a further plurality of saturable core devices having each an alternating current winding and a direct current saturating winding, means whereby each of said last mentioned saturating windings is energized with uni-directional current derived from one of said rectifiers, a plurality of load circuits, means connecting each of said load circuits to said alternating current supply circuit in series with one of said last mentioned alternating current windings, together with a second alternating current supply circuit, a two conductor transmission circuit, means including a capacitor for energizing one extremity of said transmission circuit with alternating current from said second supply circuit, means energized by said second supply circuit and including a transformer, a rectifier, and a reactor for supplying direct current to said extremity of said transmission circuit, means for varying the relative energization of said transmission circuit with alternating current and direct current respectively, means connecting said first saturating circuit to the other extremity of said transmission circuit to receive direct current therefrom, and means including a capacitor and a rectifier connected to receive alternating current from said transmission circuit for energizing said second saturating circuit with direct current in accordance with the alternating current energization of said transmission circuit.

13. In combination, an alternating current supply circuit, a plurality of saturable core devices having each an alternating current winding, a first direct current saturating winding and a second direct current saturating winding, said second saturating winding opposing the saturating effect of said first saturating winding, means connecting all of said alternating current windings in series to said alternating current supply circuit, the ratio between the turns of said first and second saturating windings being different in each of said saturable core devices, means connecting all of said first saturating windings together to form a first direct current saturating circuit, means connecting all of said second saturating windings together to form a second direct current saturating circuit, a plurality of rectifiers, means connecting each of said rectifiers in parallel with one of said alternating current windings, a further plurality of saturable core devices having each an alternating current winding and a direct current saturating winding, means whereby each of said last mentioned saturating windings is energized with unidirectional current derived from one of said rectifiers, a plurality of load circuits, a first relay, a second relay, means whereby when said first relay is operated certain of said load circuits are severally connected in series with one of said last mentioned alternating current windings to said supply circuit, means whereby when said second relay is operated other of load circuits are connected in like manner, together with a second alternating current supply circuit, a two conductor transmission circuit, means including a capacitor for energizing one extremity of said transmission circuit with alternating current from said second supply circuit, means energized by said second supply circuit and including a transformer a rectifier and a reactor for supplying direct current to said extremity of said transmission circuit, means for varying the relative energization of said transmission circuit, with alternating current and direct current respectively, means for reversing the polarity of the direct current supplied to said transmission circuit, means including said first relay and said second relay and a plurality of uni-laterally conducting devices for connecting said first saturating circuit to the other extremity of said transmission circuit whereby said first saturating circuit receives direct current of unchanging polarity from said transmission circuit and whereby said direct current flows in said first relay when said transmission circuit is energized with one polarity and said direct current flows in said second relay when said transmission circuit is energized with direct current of the opposite polarity, and means, including a capacitor and a rectifier, connected to receive alternating current from said other extremity of said transmission circuit for energizing said second saturating circuit with direct current in accordance with the alternating current energization of said transmission circuit.

14. A selective control system comprising, an alternating current supply circuit, a plurality of saturable core devices having each an alternating current winding, a first direct current saturating winding and a second direct current saturating winding, said second saturating winding opposing the saturating effect of said first saturating winding, means connecting all of said alternating current windings in series to said alternating current supply circuit, the ratio between the turns of said first and second saturating windings being different in each of said saturable core devices, means connecting all of said first saturating windings together to form a first direct current saturating circuit, means connecting all of said second saturating windings together to form a second direct current saturating circuit, a plurality of load circuits, means for energizing each of said load circuits in accordance with the voltage across one of said alternating current windings, together with a source of direct current, means for energizing said first and said second direct current saturating circuits therefrom, and means for varying the ratio between the magnitudes of the direct currents flowing in said first and said second direct current saturating circuits.

15. A selective control system comprising, an alternating current supply circuit, a plurality of saturable core devices having each an alternating current winding, a first direct current saturating winding and a second direct current saturating winding, said second saturating winding opposing the saturating effect of said first saturating winding, means connecting all of said alternating current windings in series to said alternating current supply circuit, the ratio between the turns of said first and second saturating windings being different in each of said saturable core devices, means connecting all of said first saturating windings together to form a first direct current saturating circuit, means connecting all of said second saturating windings together to form a second direct current saturating circuit, a plurality of load circuits, means for energizing each of said load circuits in accordance with the voltage across one of said alternating current windings, together with a second alternating current supply circuit, a direct current supply circuit, means for varying the relative energization of said supply circuits, a two conductor circuit, means connecting said circuit to said last mentioned supply circuits for transmitting energy possessing both direct and alternating components the relation between the magnitudes of said components being in accordance with the energization of said alternating current and direct current circuits, means for separating said alternating and direct current components, further rectifying means for rectifying said alternating current component, means for energizing one of said direct current saturating circuits with direct current from said last mentioned rectifying means, and means for energizing another of said direct current saturating circuits in accordance with said direct current component.

16. A selective control system comprising receiving apparatus consisting of an alternating supply circuit, a plurality of saturable core devices having each an alternating current winding, a first direct current saturating winding and a second direct current saturating winding, said second saturating winding opposing the saturating effect of said first saturating winding, means connecting all of said alternating current windings in series to said alternating current supply circuit, the ratio between the turns of said first and second saturating windings being different in each of said saturable core devices, means connecting all of said first saturating windings together to form a first direct current saturating circuit, means connecting all of said second saturating windings together to form a second direct current saturating circuit, a plurality of load circuits, means for energizing each of said load circuits in accordance with the voltage across one of said alternating current windings, together with transmitting apparatus consisting of, a second alternating current supply circuit, a direct current supply circuit, means for varying the relative energization of said alternating current and direct current circuits, a two conductor circuit, means connecting said circuit to said last mentioned supply circuits for transmitting said variable alternating and direct current energy to said receiving apparatus, means for predetermining the polarity of said direct current, rectifying means associated with said receiving apparatus for furnishing rectified current proportional to said alternating current energy, means for energizing one of said direct current saturating circuits from said rectifying means, uni-laterally conducting means for uni-directionally energizing another of said direct current saturating circuits by said transmitted direct current energy, together with further means, responsive to reversal of direct current polarity, for additionally controlling the energization of said load circuits, and means for energizing said further means with said transmitted direct current.

ALAN S. FITZ GER.